United States Patent [19]
Suenaga et al.
[11] 3,731,374
[45] May 8, 1973

[54] METHOD OF FABRICATING A HARD INTERMETALLIC SUPERCONDUCTOR BY MEANS OF DIFFUSION

[75] Inventors: Masaki Suenaga, Mastic Beach; William B. Sampson, Bellport; David H. Gurinsky, Center Moriches, all of N.Y.

[73] Assignee: The United States of America as represented by the United States Atomic Energy Commission

[22] Filed: July 20, 1971

[21] Appl. No.: 164,362

[52] U.S. Cl. ......................29/599, 29/198, 148/127, 174/126 CP, 174/DIG. 6
[51] Int. Cl. ..........................................H01v 11/00
[58] Field of Search.....................29/191.2, 599, 198; 174/126 CP, DIG. 6; 335/216; 148/127

[56] References Cited

UNITED STATES PATENTS

| | | | |
|---|---|---|---|
| 3,625,662 | 12/1971 | Roberts et al. | 29/599 X |
| 3,574,573 | 4/1971 | Tachikawa et al. | 29/194 |

FOREIGN PATENTS OR APPLICATIONS

| | | |
|---|---|---|
| 1,085,050 | 9/1967 | Great Britain |

*Primary Examiner*—Charles W. Lanham
*Assistant Examiner*—D. C. Reiley, III
*Attorney*—Roland A. Anderson

[57] ABSTRACT

Method of providing fine superconductors in a metal matrix wherein solid-state diffusion of a selected component from the matrix takes place and is "enhanced" by an externally added component to provide a desired superconductor alloy in the matrix.

6 Claims, 7 Drawing Figures

INVENTORS.
MASAKI SUENAGA
WILLIAM B. SAMPSON
DAVID H. GURINSKY
By Roland A. Anderson
attorney

INVENTORS

Masaki Suenaga
William B. Sampson
David H. Gurinsky
By Roland A. Anderson
attorney INVENTORS.
MASAKI SUENAGA
WILLIAM B. SAMPSON
DAVID H. GURINSKY
By Roland A. Anderson
attorney

METHOD OF FABRICATING A HARD INTERMETALLIC SUPERCONDUCTOR BY MEANS OF DIFFUSION

BACKGROUND OF THE INVENTION

This invention was made in the course of, or under a contract with the United States Atomic Energy Commission.

In the field of superconductors, it is desirable to provide a composite of fine, superconductors in a metal matrix having an electrical resistance higher than that of the superconductors. However, such composites made from the heretofore known hard superconducting compounds, such as $V_3Ga$ and $Nb_3Sn$ which as well known have an A–15, face centered cubic crystal structure, have been difficult to fabricate because they are brittle. As described in the March, 1967 Scientific American by the co-inventor of this invention, hard superconductors, also known as Type II superconductors, exclude externally applied magnetic fields until some lower critical field is reached, at which point only partial field penetration occurs. Complete penetration then occurs at an upper second critical field. It has also been difficult or expensive to increase the stability of these hard superconductor composites against "flux jumps" which, as described in the above-mentioned Scientific American article by the co-inventor of this application, produce temporary localized areas of normal resistance in the superconductors.

It is an object of this invention, therefore, to provide an improved method for fabricating a composite of hard crystal superconductors having an A–15 structure in a metal matrix;

it is also an object to provide an improved composite of fine, hard superconductor filaments and a metal matrix having a resistance higher than the superconductor filaments;

it is also an object to provide a plurality of fine, easy to fabricate relatively inexpensive, hard superconductors;

it is also an object to provide fine, hard superconductor filaments having improved stability against flux jumps;

it is also an object to decrease the A-C energy losses in a superconductor;

it is a further object to provide a pulsed superconductor magnet;

it is a still further object to provide a cold magnet synchrotron.

SUMMARY OF THE INVENTION

This invention provides fine, hard superconductors in a metal matrix and a method for making the same by solid state diffusion. More particularly, this invention provides an improved method for forming a fine, hard superconducting compound by diffusion. In one embodiment, this invention contemplates a composite of fine $V_3Ga$ superconductors in a Cu-Ga matrix, and a method for making the same by externally applied diffusions. In another aspect, this invention increases the ratio of $V_3Ga$ in a metal matrix. With the proper selection of components and steps as described in more detail hereinafter, the desired superconductors are obtained.

The above and further novel features and objects of this invention will become apparent from the following detailed description of one embodiment read in connection with the accompanying drawing, and the novel features will be pointed out in the appended claims.

BRIEF DESCRIPTION OF THE DRAWINGS

In the figures, where like elements are referred to alike:

FIG. 2*b* is a graphic illustration of the reaction temperature vs the critical current density, $J_c$, for various samples made from the composite of FIG. 1;

DESCRIPTION OF THE PREFERRED EMBODIMENT:

This invention is useful in providing fine, hard superconductors in a metal matrix. As such, this invention is particularly useful in providing pulsed magnets for charged particle transmission means, such as the cold magnet synchrotron described and shown in FIG. 2-1 of the October, 1970 BNL publication, BNL 15430 by A. von Steenbergen. Such synchrotrons employ separate and combined function, focusing and bending magnets forming a tandem arrangement of superconducting magnets and normal resistance magnets that are arranged to circulate charged particles around two endless axes in strong focusing fields, such as are described in U.S. Pat. No. 2,736,799. Suitable combined function strong focusing magnets, such as those used in the Alternating Gradient Synchroton at the Brookhaven National Laboratory, are described in U.S. Pat. No. 2,882,296, , and suitable separate function magnets used in the synchrotron at Batavia, Illinois, are described in U.S. Pat. No. 3,171,025. Both magnet types require increasing, flat topped, or pulsed current for producing magnetic fields that correspond to the energy of charged particles circulating along an endless axis. In this regard it will thus be understood that this invention is useful in the superconductor magnets described in co-pending application. Ser. No. 22,944 filed Mar. 26, 1970 by the co-inventor of this application who assigned it to the assignee of this application. Additionally, this invention is useful in transmission lines, such as described and shown in FIG. 1 of the co-pending application Ser. No. 39,066 by the co-inventor of this application who assigned that application to the assignee of this application.

In understanding this invention, it is known that non-ductile, A–15, type II, hard superconductor compounds, such as $Nb_3Sn$ and $V_3Ga$, have relatively high critical temperatures and currents. However, they are so brittle that they are difficult to fabricate into filaments and/or composite structures having a plurality of fine superconductors in a normal resistance matrix. Also, they are subject to flux jumps, such as the temporary, localized, normal resistance areas described in the above-mentioned Scientific American article. In accordance with this invention, a plurality of fine, nonductile, A-15, type II, hard superconductors are produced by solid-state diffussion of Ga from a Cu-Ga matrix, wherein the diffusion is enhanced by externally added Ga to provide fine $V_3Ga$ superconductors in the CuGa matrix. More particularly, in one embodiment, the CuGa matrix has 18 percent Ga. In this regard, more than 18 percent Ga makes drawing difficult or impossible. On the other hand, it is advantageous to provide 15–18% Ga in the Cu-Ga matrix, since this amount of Ga produces uniform deformability in the Cu-Ga matrix and in V filaments therein.

Figure 1:
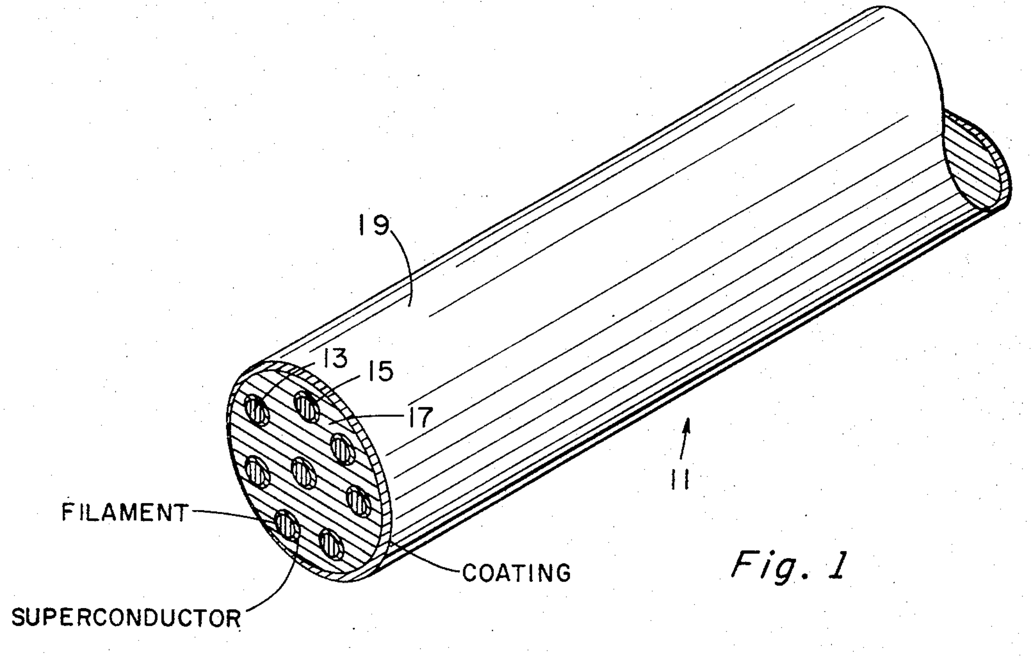
FIG. 1 is a partial three-dimensional view of one embodiment of the composite superconductor product of this invention.

Referring to FIG. 1, one embodiment of the superconductor composite 11 of this invention, comprises a plurality of fine, vanadium core-forming filaments 13 into which Ga diffuses by heat treatment. Advantageously, the filaments 13 have thereon $V_3Ga$ superconductors 15 produced by diffusion from a copper-gallium matrix 17. To this end, a gallium sheath 19 is around the outside of the matrix 17, when the composite is heat treated. This prevents a Ga deficiency in the $V_3Ga$ superconductors. In practice, this sheath 19 is formed by dipping the outside of matrix 17 in pure molten Ga whereby heat treating causes at least partial elimination of the sheath 19 by diffusion into matrix 17. In any event, the Ga from sheath 19 replaces the Ga that diffuses from matrix 17 into filaments 13 and increases the ratio of $V_3Ga$ in the Cu-Ga matrix 17. Upon completion of the $V_3Ga$ superconductors 15 in accordance with this invention, some sample characteristics thereof being illustrated by FIG.'s 2–4, the composite 11 is advantageously wound into a magnet, such as shown in FIG. 1 of the above-mentioned copending application Ser. No. 22,944 by the co-inventor of this application, for use in the above-mentioned cold magnet synchroton and/or for the beam transport systems therefor.

One actual sequence of the method of this invention for superconductors 15 in a composite 11 having an 8 mil O.D. with at least three vanadium core forming filaments 13 therein, comprises drawing a half inch Gu-Ga (18 percent Ga) alloy cylinder that contains therein a plurality of ⅛ inch diameter high purity vanadium rods. The final size of the vanadium core-forming filaments 13 was approximately 3 mils in diameter after about 20 drawings through dies varying from about ½ inch to 8 mils ($20 \times 10^{-3}$cm) in steps of about 20 percent cross-sectional area reduction. Sections of the drawn composite 11 having a gallium sheath 19 formed thereon by dipping in molten Ga, were heat treated at various temperatures and lengths of time, and metallographic observations of the samples were made in order to study the growth of the $V_3Ga$ superconductors 15 on the vanadium filaments 13. In one example for providing suitable grain sizes in the fine $V_3Ga$ superconductors 15, illustrated in FIG. 's 5 and 6, this heat treating is advantageously 100 hours at 650° C in a vacuum of $10^{-6}$ torr, i.e. about $10^{-8}$ mm of Hg. or in an inert gas. In this example 361 vanadium filaments having O.D.'s of 3 mils (7.5 $10^{-3}$ cm.) were used, and the $V_3Ga$ superconductors 15 were 1 micron thick. Also, substantially all the Ga sheath 19 diffused into matrix 17, as illustrated in FIG.'s 5 & 6.

Various numbers of vanadium filaments can be used. The filament O.D.'s, and/or the thickness of the superconductors 15 can be varied by increasing the temperatures and the times of diffusion in combination with various thicknesses of sheath 19, by one skilled in the art. In order to compare the superconducting critical temperature and critical current density of a composite having filaments 13, superconductors 15 and a matrix 17 having its sheath 19 eliminated by diffusion in to matrix 17, a set of heat treatment conditions was chosen to give approximately uniformly equal thickness ($\sim 1\mu$) of $V_3Ga$ in superconductors 15 for various reaction temperatures. These were 3 hours at 750° C, 17 hours at 700° C, 40 hours at 675° C, 240 hours at 635° C, and 600 hours at 600° C. If desired the time of heat treatment is increased with or without complete diffusion of sheath 19 into matrix 17, to cause the Ga from sheath 19 to diffuse into matrix 17 and from there into filaments 13 completely to change the filaments into $V_3Ga$.

Figure 2A:
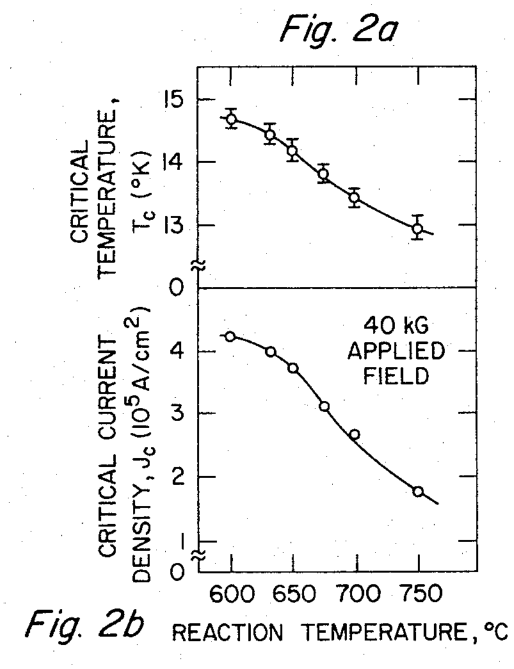
FIG. 2*a* is a graphic illustration of the reaction temperature vs the critical temperature, $T_c$, for various samples made from the composite of FIG. 1.

The resistive critical temperature, $T_c$, of the composites 11 having superconductors 15 in matrix 17 was measured by a standard four-probe method in a variable temperature vacuum can that was immersed in a liquid helium bath. The critical temperature $T_c$ increased monotonically with decreasing reaction temperature, as shown in FIG. 2*a*, which indicates the transition width and the half resistance temperature. $T_c$ varied slightly with increasing time of reaction at a constant temperature. However, this latter variation was much less than that due to the changes in the reaction temperature. Moreover, the characteristic variation of the $T_c$ with reaction temperature for the $V_3Ga$ superconductors 15 of this invention was different from that for $V_3Ga$ produced by the diffusion of pure Ga on V. This difference, it is theorized, may be due to the presence of the Cu in the matrix 17 of this invention in the described close proximity to the $V_3Ga$ superconductors 15 of this invention. Moreover, this invention avoids the undesirable deficiency of Ga in the described $V_3Ga$ superconductors 15 of this invention in accordance with the described solid state diffusion process of this invention, which comprises an inward diffusion from sheath 19.

The critical current density $J_c$ of the composite 11 of this invention having superconductors 15 in matrix 15 was measured using a standard four-wire technique. To this end, lengths of the described composite 11 approximately 5 cm long were mounted transversely in the bore of a conventional superconducting solenoid and potential leads were connected to indicate the voltage developed across the central 3 cm of the sample of the composite 11. The minimum resistivity that could be detected was $10^{-12}$ ohm-cm corresponding to $1\mu$at 3 amps and was used for the criteria for the critical current, $I_c$, of the composite 11. Also, $J_c = (I_c/\text{area of } V_3Ga)$. The resistive transition was found to occur smoothly with considerable current sharing between the filaments 13, superconductors 15 and matrix 17 before the composite 11 went fully from its superconducting into its normal resistance state.

The dependence of $J_c$ on reaction temperature is shown in FIG. 2*b* for an applied magnetic field of 40kG. The increase in $J_c$ at lower reaction temperatures is assumed to be due to the smaller grain sizes for the $V_3Ga$ in the superconductors 15 that was formed at the lower temperatures illustrated, since flux pinning in $V_3Ga$ is considered to be predominantly by grain boundaries.

Figure 3:
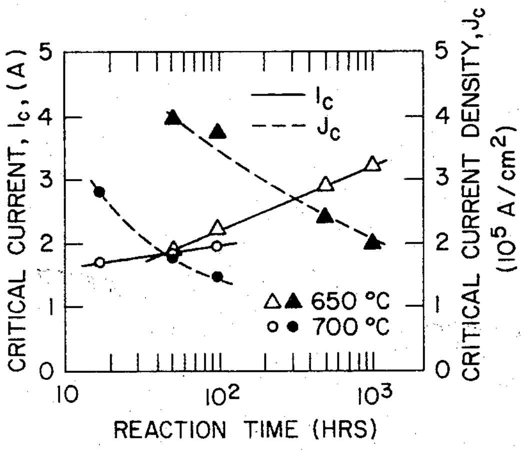
FIG. 3 is a graphic illustration of the reaction time vs critical current, $I_c$, (A), and critical current density, $J_c$, ($10^5$ A/cm$^2$), for various samples made from the composite of FIG. 1.
Figure 5:
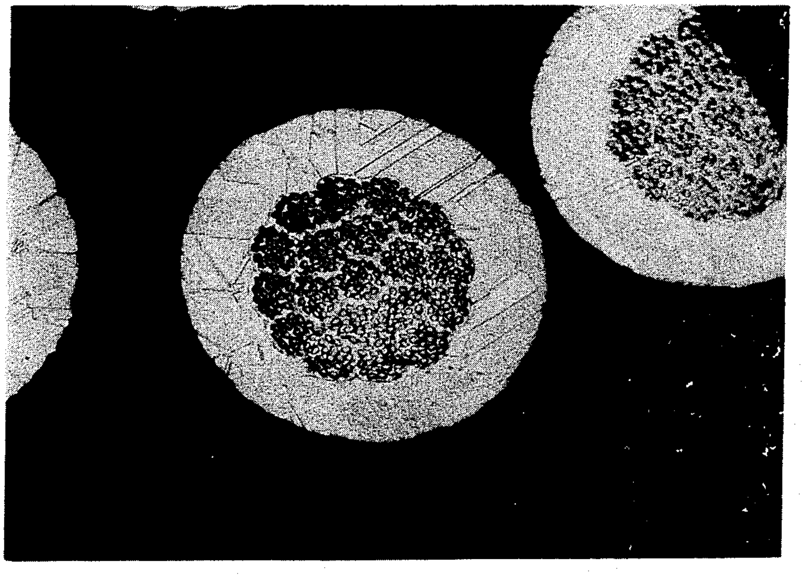
FIG. 5 is a photomicrograph at 250X of another embodiment of this composite of this invention.
Figure 6:
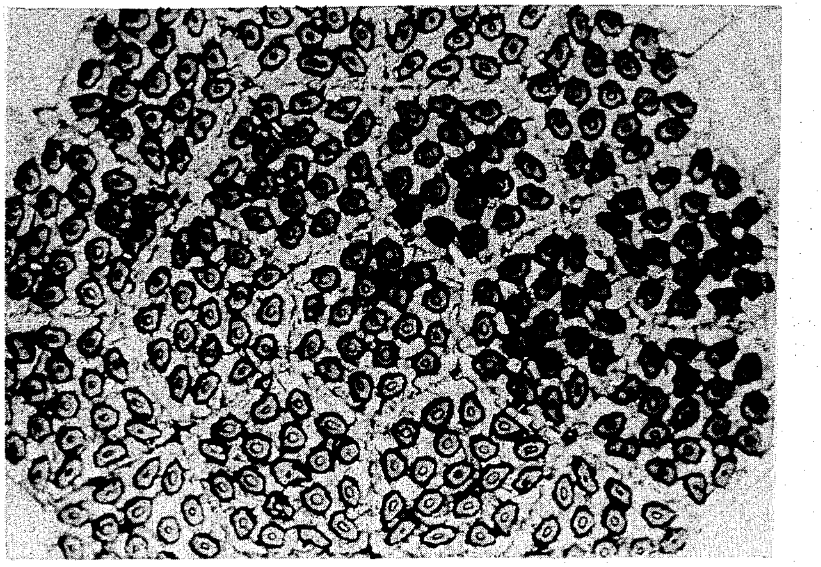
FIG. 6 is a photomicrograph at 1,000X of the embodiment of FIG. 5.

The effect of increased reaction time on the critical current, $I_c$, of sample composites 11 is illustrated in FIG. 3 for two reaction temperatures, i.e., 650° and 700° C. Although $I_c$ increased with increasing reaction time due to thickening of the layers or coats of the $V_3Ga$ superconductors 15 on V filaments 13, $J_c$ decreased rapidly with time. This reduction in $J_c$ is attributed to the growth of the grains in the $V_3Ga$ superconductors 15 during the layer thickening process. Accordingly, heat treatment at 650° C was the preferred temperature selected for the above-described example of the method of this invention.

Figure 4:
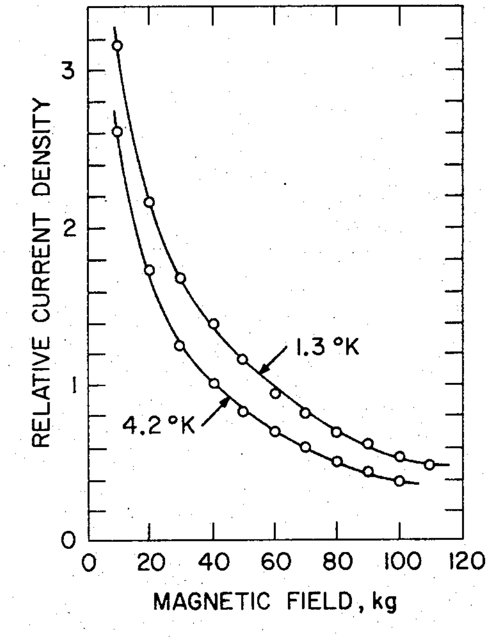
FIG. 4 is a graphic illustration of magnetic field vs relative current density for various samples made from the composite of FIG. 1.

The $V_3Ga$ superconductors 15 of this invention have a high critical current density at high magnetic field strengths. $J_c(H)$ for a composite 11 formed by heat treating at 650° C for 500 hours, was measured at two superconducting temperatures, i.e., 4.2° K and 1.3 K, as illustrated in FIG. 4, where the current has been normalized to its 40 kG value for comparison with FIG. 2*b*. The values of $J_c$ for this composite 11 below 100 kG are higher than or comparable to those reported heretofore.

The mechanical properties of samples of composites 11 of filaments 13 and superconductors 15 in a matrix 13 were examined by bending them around a mandrel, straightening them and examining their resistive transition at 4.2° K and 40 kG. Progressively smaller mandrels were used until a change in the resistive transition was detected. In this regard, the composite 11 could be bent around a 1 inch diameter mandrel without damage.

In another embodiment of the above-described method for increasing the ratio of the $V_3Ga$ alloy matrix, the matrix 17 is exposed to Ga vapor during the described heat treatment.

While the above has described several embodiments of the superconductor of this invention, it is understood that other superconductors can be produced by the method of this invention. For example, the method of this invention can be employed to produce a multifilamentary superconductor composite of $Nb_3Sn$ in a CuSn matrix. To this end, Nb rods in a CuSn (10%Sn) cylinder are drawn, as described above, to reduce the Nb rod diameters. Then the assembly is coated with Sn by dipping in molten Sn, and the Sn is diffused inward to form $Nb_3Sn$ by heat treating between 700° and 650° C in a vacuum or in an inert gas.

Additionally, while several uses for the superconductor and composite of this invention have been described, other uses will be apparent to one skilled in the art.

The invention has the advantage of providing an improved superconductor and a composite of fine superconductors in a copper containing metal alloy matrix having an increased ratio of superconductor in the matrix. The composite of this invention is particularly advantageous for high field cryogenic magnets and for charged particle transport systems. Also, specific $V_3Ga$ superconductors are produced by this invention having a compound structure of 3 parts V and 1 part (25 percent) Ga, and a cubic crystal structure.

What is claimed is:

1. The method of forming a plurality of $V_3Ga$ superconductors in a matrix, comprising the steps of:
   a. coating Ga on the outside of a longitudinally extending Cu-Ga element containing vanadium filaments spaced apart throughout the Cu-Ga element to form a composite of said vanadium filaments in a Cu-Ga matrix having a Ga sheath thereon; and
   b. diffusing the Ga from the Ga sheath toward the vanadium filaments to form therefrom a plurality of $V_3Ga$ superconductors throughout said matrix, said diffusing of said Ga sheath increasing the thickness of said $V_3Ga$ superconductors throughout said matrix above a zero thickness and up to a point where said vanadium filaments are completely changed into a $V_3Ga$ compound by the diffusing of said Ga from the Ga sheath, the latter increasing the ratio of said $V_3Ga$ to the matrix while preventing the deficiency of Ga in said $V_3Ga$ superconductors for effecting the formation of said $V_3Ga$ compound in accordance with said diffusing of said Ga from said Ga sheath toward said vanadium filaments.

2. The method of claim 1 in which said vanadium filaments are formed by assembling a Cu-Ga (18 % Ga) alloy cylinder around high purity vanadium rods, and then the assembly is drawn to reduce the outside diameter of said rods.

3. The method of claim 1 in which said diffusion is performed in an atmosphere containing Ga vapor.

4. The method of claim 1 in which said diffusion is produced by heating to at least 600° C.

5. The method of claim 1 in which said diffusion is produced by heating said Ga sheathed Cu-Ga matrix and vanadium filaments therein at 650° for 100 hours in an atmosphere containing Ga vapor.

6. The method of claim 1 in which said Ga sheath around said Cu-Ga matrix is formed by dipping said matrix in molten Ga.

* * * * *